Patented Oct. 28, 1952

2,615,876

UNITED STATES PATENT OFFICE 2,615,876

COPOLYMERS OF VINYLIDENE CYANIDE AND VINYL ESTERS OF ALPHA-HALOGEN SUBSTITUTED ACIDS

Harry Gilbert, Cuyahoga Falls, and Floyd F. Miller, Akron, Ohio, assignors to The B. F. Goodrich Company, New York, N. Y., a corporation of New York No Drawing. Application August 25, 1950, Serial No. 181,572

13 Claims. (Cl. 260—78.5)

This invention relates to the preparation of novel copolymers of vinylidene cyanide and vinyl esters of alpha-halo saturated aliphatic monocarboxylic acids, which copolymers are extremely useful in the preparation of filaments and films.

In U. S. Patents 2,476,270 and 2,502,412 to Alan E. Ardis, and 2,514,387, to Harry Gilbert, novel methods for the preparation of monomeric vinylidene cyanide are disclosed. In a copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with vinyl esters of alpha-halo saturated aliphatic monocarboxylic acids in the presence of a free radical catalyst to give new and highly useful copolymers. It has also been discovered that when the polymerization is carried out in such a manner that the charge contains from 2 to 70 mole per cent of vinylidene cyanide, the copolymers obtained are unique in that they are essentially 1:1 alternating copolymers, that is, copolymers possessing the structure:

wherein each $M_1$ is a vinylidene cyanide unit

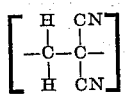

and each $M_2$ is a unit of a vinyl ester of an alpha-halo saturated aliphatic monocarboxylic acid and $x$ is any number, preferably from 125 to 10,000. The fact that the copolymers obtained when the specific vinylidene cyanide charging ratio is utilized are essentially 1:1 alternating copolymers is determined by analysis of the copolymer and by the following copolymerization equation of F. M. Lewis, C. Walling, et al., Journal of the American Chemical Society 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein $(M_1)$ = concentration of unreacted monomer $M_1$
$(M_2)$ = concentration of unreacted monomer $M_2$
$r_1$ = ratio of rate constants for the reaction of an $M_1$ type radical with $M_1$ and $M_2$ respectively
$r_2$ = ratio of the constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to zero, a 1:1 alternating copolymer is formed, that is having a copolymer having the —$M_1$—$M_2$($M_1$—$M_2$)$_x$$M_1$—$M_2$— structure shown hereinabove for the copolymers of vinylidene cyanide with vinyl esters of alphahalo saturated aliphatic monocarboxylic acids. That these copolymers possess the 1:1 alternating structure is demonstrated by the fact that the product of $r_1$ and $r_2$ as calculated for the vinylidene cyanide-vinyl ester of an alpha-halo saturated aliphatic monocarboxylic acid copolymer system is substantially zero.

It is highly surprising that vinylidene cyanide will polymerize with vinyl esters of alpha-halo saturated aliphatic monocarboxylic acids to give the essentially 1:1 alternating type copolymers, since almost without exception monomer pairs exhibit a very strong tendency to polymerize randomly, as is the case in the present invention when the charge contains less than 2 or more than 70 mole per cent of vinylidene cyanide rather than to form the 1:1 alternating type copolymer, this being especially true of vinyl and vinylidene compounds.

The vinyl esters which are polymerized with vinylidene cyanide in accordance with this invention possess the structure

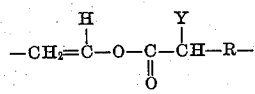

wherein R is a member of the class consisting of hydrogen and alkyl radicals, preferably a lower alkyl radical, and Y is a halogen atom. Because of its relatively low cost and the fact that it may be readily obtained in commercial quantities vinyl chloroacetate is the preferred monomer for use in the polymerization with vinylidene cyanide. However, other monomers of the above general class are also polymerized with vinylidene cyanide with good results. Among such other monomers are included vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, vinyl alpha-bromovalerate and the like.

The polymerization itself may be carried out in several different ways. One preferred method consists in first dissolving the vinylidene cyanide and the vinyl ester in benzene or other aromatic solvents such as toluene, trichlorobenzene, xylenes, ethylbenzene or the like, preferably free from impurities which initiate the ionic polymerization of the monomer, and in an amount such that the solvent comprises approximately 30 to 80% by weight of the total solution. A polymerization catalyst is included in this solution and the resulting mixture is maintained at a temperature of about 20° C. to 100° C., whereupon polymerization occurs to form the desired copolymer as a white powder of small particle size. The copolymer thus formed may be separated from the polymerization medium simply by filtering, or if desired the solvent may be removed by evaporation.

A second method of polymerization consists in heating and agitating a mixture of the monomers and the polymerization catalyst without the use of a solvent or other liquid medium for the monomers, whereupon polymerization occurs to form the copolymer as in the above method. Also, the polymerization may be effected at temperatures as low as 0° C. or lower or as high as 100° C. or even higher provided a catalyst is utilized which will dissociate into free radicals at the polymerization temperature.

Alternatively, the polymerization may be carried out by agitating the monomers in a liquid aliphatic hydrocarbon (which are non-solvents for vinylidene cyanide), for example hexane or heptane, in the presence of a polymerization catalyst, whereupon the copolymer forms and may be separated from the polymerization medium by filtering or by evaporating the liquid hydrocarbon. It is important when utilizing this method of polymerization that the liquid aliphatic hydrocarbon be free from impurities which initiate the ionic polymerization of vinylidene cyanide.

It is to be understood, of course, that regardless of the polymerization method utilized, the polymerization should be stopped before either of the monomers is entirely consumed, in order that an essentially 1:1 alternating copolymer will be obtained. Otherwise, when either of the monomers is completely used up, the product will contain straight polymer obtained by polymerization of the remaining monomer. Accordingly, it is often desirable to add, either continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semicontinuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caproyl peroxide, pelargonyl peroxide, tertiary butyl hydroperoxide, tetralin peroxide, and the like. In general, from 0.01 to 1.0% by weight of the catalyst based on the weight of the monomers is utilized, although smaller or larger amounts may be utilized if desired.

The following examples illustrate the preparation of copolymers of vinylidene cyanide and vinyl esters of alpha-halo saturated aliphatic monocarboxylic acids in accordance with this invention, but are not to be construed as a limitation upon the scope thereof, for there are, of course, numerous possible variations and modifications. In the examples all parts are by weight.

Examples I to V

A series of vinylidene cyanide-vinyl chloroacetate copolymers is prepared by admixing vinylidene cyanide and vinyl chloroacetate (the vinyl chloroacetate acting as a diluent) together with o,o'-dichlorobenzoyl peroxide as a polymerization catalyst and heating the resulting mixture to a temperature of about 40° C. whereupon polymerization occurs to form the desired copolymers. After approximately five hours the copolymer is removed by filtering. The charging rates of monomers and catalyst, the per cent nitrogen in the copolymer and the mole percentage of vinylidene cyanide in the copolymer are recorded in the following table:

|  | Ex. I | Ex. II | Ex. III | Ex. IV | Ex. V |
|---|---|---|---|---|---|
| Parts vinylidene cyanide | 6.88 | 8.89 | 7.64 | 3.96 | 0.99 |
| Mole percent vinylidene cyanide | 90.0 | 70.0 | 50.0 | 30.0 | 10.0 |
| Parts vinyl chloroacetate | 1.18 | 5.90 | 11.8 | 14.28 | 13.75 |
| Mole percent vinyl chloroacetate | 10.0 | 30.0 | 50.0 | 70.0 | 90.0 |
| Parts catalyst | 0.04 | 0.07 | 0.097 | 0.09 | 0.074 |
| Percent N in copolymer | 19.09 | 16.40 | 15.32 | 14.58 | 14.14 |
| Mole percent vinylidene cyanide in copolymer | 63.7 | 56.5 | 53.5 | 51.4 | 50.1 |

It will be noted from the table that when the charge contains from about 2 to 70 mole per cent vinylidene cyanide, the copolymer contains approximately 50 mole per cent vinylidene cyanide, thus demonstrating that an essentially 1:1 alternating copolymer is obtained.

When other vinyl esters of alpha-halo saturated aliphatic monocarboxylic acids selected from those disclosed hereinabove are substituted for vinyl chloroacetate in the above examples, the copolymers obtained possess properties generally equivalent to the vinylidene cyanide-vinyl chloroacetate copolymers. Likewise, when the polymerization is carried out according to the other methods described hereinabove, or using other of the peroxygen catalysts disclosed, excellent results are achieved.

The copolymers which are prepared according to this invention are hard resinous materials characterized by being soluble in dimethylformamide and hot cyclohexanone. They are insoluble in acetone, alcohols, benzene and ethers.

As disclosed hereinabove, the copolymers of this invention are valuable in the preparation of solutions from which can be spun filaments of any desired size and which exhibit a crystalline pattern when examined by X-rays and which possess high tensile strength, excellent resistance to the action of alkalis and acids, as well as many other advantageous properties. Also, since the copolymers of this invention are characterized by having a definite softening point, they may be melt spun, cast into excellent films or molded into shaped objects.

Although specific examples of the invention have been herein described, it is not intended to limit the invention solely thereto, but to include all of the variations and modifications falling within the spirit and scope of the appended claims.

We claim:

1. A copolymer of vinylidene cyanide and a vinyl ester of an alpha-halo saturated aliphatic monocarboxylic acid, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

2. A copolymer of vinylidene cyanide and a vinyl ester of the formula

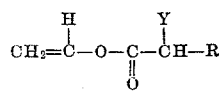

wherein R is a member of the class consisting of hydrogen and alkyl radicals, and Y is a halogen atom, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

3. A copolymer of vinylidene cyanide and vinyl chloroacetate, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

4. A copolymer of vinylidene cyanide and a vinyl ester of an alpha-halo saturated aliphatic monocarboxylic acid, said copolymer possessing essentially the structure

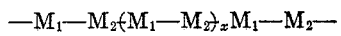

wherein each $M_1$ is a vinylidene cyanide unit, each $M_2$ is a unit of said vinyl ester and $x$ is a number, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

5. A copolymer of vinylidene cyanide and a vinyl ester of the formula

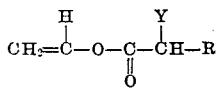

wherein R is a member of the class consisting of hydrogen and alkyl radicals, and Y is a halogen atom, said copolymer possessing essentially the structure

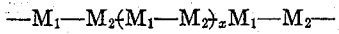

wherein each $M_1$ is a vinylidene cyanide unit, each $M_2$ is a unit of said vinyl ester and $x$ is a number, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

6. A copolymer of vinylidene cyanide and vinyl chloroacetate, said copolymer possessing essentially the structure

wherein each $M_1$ is a vinylidene cyanide unit, each $M_2$ is a unit of vinyl chloroacetate and $x$ is a number, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin.

7. The method which comprises mixing together vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and a vinyl ester of an alpha-halo saturated aliphatic monocarboxylic acid, in the presence of a peroxygen catalyst, whereupon polymerization occurs to form a copolymer of vinylidene cyanide and said vinyl ester.

8. The method which comprises dissolving vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and a vinyl ester of the formula

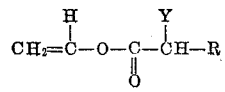

wherein R is a member of the class consisting of hydrogen and alkyl radicals, and Y is a halogen atom, maintaining the mixture at a temperature of from 20° C. to 100° C., in the presence of a peroxygen catalyst, whereupon polymerization occurs to form a copolymer of vinylidene cyanide and said vinyl ester.

9. The method which comprises mixing together vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and vinyl chloroacetate, maintaining the mixture at a temperature of from 20° C. to 100° C., in the presence of a peroxygen catalyst, whereupon polymerization occurs to form a copolymer of vinylidene cyanide and vinyl chloroacetate.

10. The method which comprises mixing together vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and a vinyl ester of an alpha-halo saturated aliphatic monocarboxylic acid in an amount such that the mixture contains from 2 to 70 mole per cent of vinylidene cyanide based on the total monomer weight, and including a peroxygen catalyst in the mixture, whereupon polymerization occurs to form a copolymer which possesses essentially the structure

wherein each $M_1$ is a vinylidene cyanide unit, each $M_2$ is a unit of said vinyl ester, and $x$ is a number.

11. The method which comprises mixing together vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and a vinyl ester of the formula

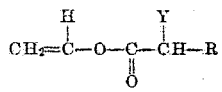

wherein R is a member of the class consisting of hydrogen and alkyl radicals and Y is a halogen atom, in an amount such that the mixture contains from 2 to 70 mole per cent of vinylidene cyanide based on the total monomer weight, and including a peroxygen catalyst in the mixture, whereupon polymerization occurs to form a copolymer which possesses essentially the structure

wherein each $M_1$ is a vinylidene cyanide unit, each $M_2$ is a unit of said vinyl ester, and $x$ is a number.

12. The method which comprises mixing together vinylidene cyanide and vinyl chloroacetate in an amount such that the mixture contains from 2 to 70 mole per cent of vinylidene cyanide based on the total monomer weight, maintaining the mixture at a temperature of from 20° C. to 100° C., and including a peroxygen catalyst in the mixture, whereupon polymerization occurs to form a copolymer which possesses essentially the structure

wherein each $M_1$ is a vinylidene cyanide unit, each $M_2$ is a unit of vinyl chloroacetate and $x$ is a number.

13. The method of claim 12 wherein the peroxygen catalyst is o,o'-dichlorobenzoyl peroxide.

HARRY GILBERT.
FLOYD F. MILLER.

REFERENCES CITED

The following references are of record in the file of this patent:

UNITED STATES PATENTS

| Number | Name | Date |
|---|---|---|
| 2,466,395 | Dickey | Apr. 5, 1949 |
| 2,486,241 | Arnold | Oct. 25, 1949 |